United States Patent [19]

Langsley

[11] 4,059,569

[45] * Nov. 22, 1977

[54] ANTIOXIDANT RESINS FROM MERCAPTOALDEHYDES

[75] Inventor: Gerald William Langsley, Baslow, England

[73] Assignee: Coalite and Chemical Products Limited, Bolsover, England

[*] Notice: The portion of the term of this patent subsequent to Oct. 12, 1993, has been disclaimed.

[21] Appl. No.: 725,512

[22] Filed: Sept. 22, 1976

[30] Foreign Application Priority Data

Oct. 9, 1975 United Kingdom ............... 41527/75

[51] Int. Cl.² ............................................. C08G 75/04
[52] U.S. Cl. ................... 260/48; 260/45.7 S; 260/45.95 R; 260/51 R; 260/53 R; 260/55

[58] Field of Search ..................... 260/48, 51 R, 53 R, 260/55

[56] References Cited

U.S. PATENT DOCUMENTS 3,985,710  10/1976  Langsley ............................... 260/48

*Primary Examiner*—Howard E. Schain
*Attorney, Agent, or Firm*—Foster York

[57] ABSTRACT

It has been found that a sulphur containing resin which is the condensation product of (i) one or more mercaptoaldehydes and (ii) one or more meta-substituted phenols has good antioxidant properties. Mixtures of m/p-alkylphenols are used to particular advantage in the production of this resin. A small amount of the resin retards the oxidation of rubbers or polyolefins and the resin is particularly useful as a melt stabilizer during the extrusion of a polymer.

22 Claims, No Drawings

ANTIOXIDANT RESINS FROM MERCAPTOALDEHYDES

BACKGROUND OF THE INVENTION

The invention relates to antioxidant resins and to a process for their production.

There is disclosed in British Patent Specification No. 1,450,205 a resin which is the condensation product of a mercaptoaldehyde and a phenol containing a substituent in a position ortho or para to the phenolic hydroxyl group and which is unsubstituted in at least one of the two remaining ortho and para positions. The resin which contains phenolic groups and one or more sulphide linkages has good antioxidant properties.

It has now been found that similar resins produced from a mercaptoaldehyde and a meta-substituted phenol are also effective antioxidants.

SUMMARY OF THE INVENTION

According to the invention therefore, there is provided a sulphur-containing resin which is the condensation product of (i) one or more mercaptoaldehydes, as herein defined, and (ii) one or more meta-substituted phenols, particularly one or more m-alkylphenols, or a mixture of one or more meta-substituted phenols and one or more other phenols, particularly para-substituted phenols, for example a mixture of m- and p-alkylphenols such as m/p-isopropylphenol. The m-substituted phenol residues in the resin preferably form more than 50% by weight of the total phenol residues in the resin.

The invention further provides a composition comprising organic matter and a minor amount of the sulphur-containing resin sufficient to prevent or retard oxidation of said organic matter. The organic matter may, for example, be a hydrocarbon which may at 20° C be a liquid or solid, for example, a mineral or synthetic lubricating oil, or it may be a polymeric substance such as a synthetic thermoplastic substance, for example a polyolefin, or a natural or synthetic rubber. The organic matter may also be a hot melt adhesive. The sulphur-containing resin will generally be present in an amount sufficient to have an antioxidant effect and it may form 0.01 – 10%, preferably 0.5 – 3%, by weight of the composition. The resin will be present substantially uniformly throughout the composition. The sulphur-containing resin may function as a melt stabiliser during the processing of a polymer, for example during the extrusion of a polyolefin.

According to the invention furthermore, there is provided a process for the production of a sulphur containing resin, which comprises subjecting (i) one or more mercaptoaldehydes, as herein defined, to condensation with (ii) one or more meta-substituted phenols, or a mixture of one or more meta-substituted phenols and one or more other phenols. The phenolic reactant in the condensation mixture may consist solely of the meta-substituted phenol or phenols or it may contain another phenol, for example hydroxybenzene and/or another meta-subtituted phenol and/or a para-substituted phenol. One preferred phenolic reactant is a mixture of meta- and para-substituted phenols, particularly a mixture of m/p-alkylphenols such as m/p-cresol mixture and a m/p-isopropylphenol mixture. The phenol or phenols used will contain an unsubstituted nuclear position, preferably a position ortho or para to the phenolic hydroxyl group, and it will be understood that the substituents will be such as not to prevent, sterically or otherwise, the phenol or phenols or at least one meta-substituted phenol from undergoing condensation with the mercaptoaldehyde. At least two unsubstituted positions will preferably be present in each phenol nucleus. More than one mercaptoaldehyde may be present in the condensation reaction mixture. The condensation reaction is preferably carried out under nitrogen or other inert atmosphere.

The meta-substituted phenol used in the production of the resin suitably has the general formula:

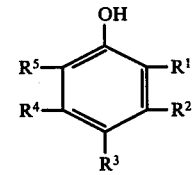

in which $R^2$ denotes a substituent and at least one, preferably at least two, of $R^1$, $R^3$, $R^4$ and $R^5$ denote hydrogen, any of $R^1$, $R^3$, $R^4$ and $R^5$ not denoting hydrogen denoting a substituent. Advantageously at least one, preferably two, of $R^1$, $R^3$ and $R^5$ denote hydrogen. The meta substituent $R^2$ is preferably an aliphatic or cycloaliphatic hydrocarbyl group, particularly one containing not more than 8 carbon atoms such as an alkyl, alkenyl, cycloalkyl or cycloalkenyl group, for example, methyl, isopropyl, n-butyl, allyl or cyclohexyl group. The members $R^1$, $R^3$, $R^4$ and $R^5$ which are not hydrogen are preferably $C_1 - C_4$ alkyl groups or halogen, for example, chlorine or bromine. Suitable meta-substituted phenols include m-cresol, m-isopropylphenol and o-chloro-m-cresol.

The phenol used in the production of the resin is, as hereinbefore stated, preferably a mixture of meta- and para-substituted phenols, particularly a m/p-alkylphenol mixture. It has been found that when a mixture of m/p-alkyl phenols is used, the metal isomer tends to be more reactive than the para isomer with the result that the molar ratio of m-alkylphenyl groups to p-alkylphenyl groups in the resin is greater than the molar ratio of the m-alkylphenols to the p-alkylphenols in the feed to the condensation reaction. This feature tends to be more noticeable with a higher alkylphenol mixture, e.g. m/p-isopropylphenol, than with a lower alkylphenol, e.g. m/p-cresol.

The term "mercaptoaldehyde" is used in the present specification to denote an alkyl aldehyde containing a sulphur link in the alkyl chain. The mercaptoaldehyde may be prepared by reacting an unsaturated, open chain aldehyde, preferably acrolein or crotonaldehyde, with an alkyl mercaptan.

The preferred mercaptoaldehydes used in the production of the sulphur-containing resin have the following general formula:

in which R is a $C_1 - C_{17}$ alkyl group which may be a straight or branched chain e.g. lauryl, decyl, octyl, heptyl, amyl, n-butyl, isobutyl or ethyl, and $R_1$ denotes hydrogen or a lower alkyl group, for example a $C_1 - C_4$ alkyl group, particularly methyl. The alkyl group R is advantageously a straight chain group and preferably contains from 2 to 12 carbon atoms, particularly from 2 to 8 carbon atoms, and especially from 3 to 6 carbon atoms.

The mercaptoaldehyde is suitably produced by reacting the mercaptan RSH with the appropriate unsaturated aldehyde $R_1CH = CHCHO$ at a temperature of from $-30°$ C to $+30°$ C, preferably at a temperature in the range $0°-15°$ C, in the presence or absence of a basic catalyst, for example piperidine, and preferably in an inert atmosphere, for example nitrogen. The reaction time may be 1-150 hours but the reaction conditions are preferably such that the reaction is complete within from 2 to 100 hours. The mercaptoaldehyde so formed can be used without purification in the production of the resin. The mercaptan and the aldehyde are preferably reacted in the presence of a solvent, except when the mercaptoaldehyde is itself a liquid at room temperature. Thus, for example, with β-laurylmercaptopropanal which is a solid at room temperature, lauryl mercaptan and acrolein are preferably reacted in the presence of a solvent, for example, a hydrocarbon fraction such as a petroleum ether. In such case, the solvent is preferably recovered and recycled.

The phenol and the mercaptoaldehyde are suitably reacted in a phenol/aldehyde molar ratio of from 0.5:1 to 8:1, preferably from substantially 1:1 to substantially 4:1, at a temperature in the range from $-30°$ C to $+150°$ C, advantageously from $0°$ C to $80°$ C and preferably from $10°$ C to $50°$ C, in the presence or absence of a solvent. The solvent is preferably one which forms an azeotrope with water. It has been found to be advantageous to add the solvent to the reaction mixture after the initial stage of the reaction is complete and to distil off the water of condensation as an azeotrope with the solvent, e.g. toluene, at atmospheric pressure. This step provides a cleaner product. The product resin may be recovered by removing residual volatile components from the bottoms product of the atmospheric distillation, for example by heating that bottoms product to 220° C under a fairly high vacuum, e.g. 3 mm Hg. The residue from such heating may be used as the resin as it is or it may be further purified.

The condensation reaction may be carried out in the presence of a mercaptan catalyst and with HCl as cocatalyst. When a mercaptan catalyst is used, the mercaptan may be present as an impurity in the mercaptoaldehyde, in which case no separate addition of mercaptan will be required. The condensation reaction may take from 1 to 24 hours but is preferably carried out under such conditions that it is complete within 2-15 hours.

The resin is suitably of relatively low molecular weight and it may be a bisphoenol or it may contain more than two (for example, 3, 4, 5, 6 or more) phenolic nuclei in its molecule, the phenolic nuclei being bridged by alkylthioether-substituted methylene groups. The resin is thermally stable up to relatively high temperatures, is generally soluble in many organic solvents and at room temperature (20° C) is generally in the form of a viscous liquid, a glassy solid which may flow freely at 60° - 80° C or a solid which softens at a temperature in the range 50° - 80° C.

The resins provided according to the invention have antioxidant properties substantially equivalent to or better than those possessed by the resins produced from ortho- or para-substituted phenols alone, that is, the resins forming the subject-matter of British Patent Specification No. 1,450,205. One advantage of using the mixture of m/p-isopropylphenols is that it confers improved oil solubility on the low molecular weight resins, so rendering those resins more suitable as antioxidants for oils and other hydrocarbon substrates.

DETAILED DESCRIPTION OF THE INVENTION

The preparation of precursor mercaptoaldehydes is illustrated in the following Runs A, B and C whilst the invention is illustrated in Examples 1 to 4.

Run A

Preparation of β-laurylmercaptopropanal.

Lauryl mercaptan (202 g) and piperidine (1 drop) were dissolved in 80° - 100° dry petroleum ether (120 ml) and cooled to 0°-5° C in a flask equipped with a stirrer, dropping funnel, thermometer pocket and a vent pipe. Acrolein (56 g) was then added dropwise over a period of 30-60 mins. at such a rate that the temperature of the flask remained below 15° C. The mixture was then stirred for a further 22-24 hours during which time the product, β-laurylmercaptopropanal, crystallised out of solution as a white solid. This solid was recovered by filtration in a yield of 65.5% (169 g). 125 ml of the solvent were recovered.

Run B

Preparation of β-laurylmercaptopropanal using recovered solvent.

Reaction carried out as in Run A, but the solvent recovered from that Run was used in place of the 80-100 petroleum ether. The yield of product was 224 g. The solvent can be reused at least 4 times.

Run C

Preparation of β-(n-butylmercapto)propanal.

A mixture of butylmercaptan (180 g) and piperidine (1 drop) was cooled to 0.5° C in a flask equipped with a stirrer, dropping funnel, thermometer pocket and vent pipe and acrolein (112 g) was added dropwise over a period of 2-3 hours at such a rate as to maintain the temperature at less than 15° C. After all the acrolein had been added, the mixture was stirred for a further 20-24 hours, and the resulting mixture was taken as product (100% yield).

Example 1

A resin was prepared from m/p cresol and β-(n-butylmercapto)propanal.

A mixture of the crude β-(n-butylmercapto)propanal (26 g) from Run C and a cresol fraction consisting of 62 g m-cresol and 69 g p-cresol was heated to 50° C under nitrogen in a flask equipped with a stirrer, thermometer pocket, nitrogen inlet port, hydrogen chloride gas inlet port and a still head through which volatile products could be removed by distillation. After maintaining the temperature at 50° C for 20-30 mins. to ensure the displacement of air (by the $N_2$ flow) from the flask, the hydrogen chloride flow was started, and the colour of the reaction mixture darkened. The HCl gas flow was maintained for 90 mins., after which it was disconnected and toluene (80 ml) was added to the mixture. The mixture was then heated to a temperature of 170° C, during which time the toluene and water from the reaction boiled off, and a considerable lightening in the colour of the reaction mixture was observed. The mixture was then cooled and subjected to distillation under reduced pressure (20 mm Hg) until the temperature of the mixture reached 220° C, during which time unreacted cresols (34 g m-cresol, 57 g p-cresol) were recovered. The mixture was then cooled to yield 57 g of a product resin which, when added to liquid paraffin at a concentration of 0.1%, stabilised the oil at 120° C for more than 450 hours. The toluene/water fraction obtained was separated and the toluene reused in further resin preparations, and the recovered cresols were likewise recycled.

Example 2

A resin was prepared from m/p cresol and β-laurylmercaptopropanal.

The reaction was carried out as in Example 1 using a m/p cresol fraction (432 g) and β-laurylmercaptopropanal (127 g). This gave a product (189 g) which, when added to liquid paraffin at a concentration of 0.1%, stabilised the oil at 120° C for more than 600 hours.

Example 3

A resin was prepared from m/p-isopropylphenol and β-laurylmercaptopropanal.

Reaction was carried out as in Example 1, but using a mixture of isopropylphenol containing 145 g of the meta isomer and 70 g of the para isomer and β-laurylmercaptopropanal (51 g). This yielded a product resin (80 g) which, when added to liquid paraffin at a concentration of 0.1%, stabilised the oil at 120° C for more than 600 hours. The recovered m/p-isopropylphenol fraction contained 106 g of the meta and 66 g of the para isomer.

Example 4

A resin was prepared from m/p-isopropylphenol and β-(n-butylmercapto)propanol.

The reaction was carried out as in Example 1 but using a mixture of isopropylphenol (157 g) and β-(n-butylmercapto)propanol (26 g).

The product resin (57 g) when added to liquid paraffin at a concentration of 01.1% stabilised the oil at 120° C for more than 600 hours.

In the Examples, the effect of the condensation product in inhibiting the oxidation of liquid paraffin at 120° C was determined by maintaining 30 g of liquid paraffin containing 0.1% of the condensation product at 120° C whilst oxygen was bubbled through at a rate of one liter per hour. Any volatile acid produced was collected and titrated daily against 0.1N potassium hydroxide. A pronounced increase in the rate of evolution of volatile acids indicated the end of the induction period, that is, the end of the period of stabilisation afforded by the condensation product.

Having defined our invention, we claim:

1. A sulphur containing resin which is the condensation product of (i) one or more mercaptoaldehydes and (ii) one or more meta-substituted phenols, or a mixture of one or more meta-substituted phenols and one or more other phenols wherein the meta-substituted phenol has the general formula:

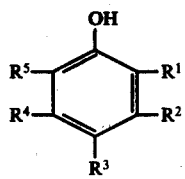

in which $R^2$ denotes a substituent and at least one of $R^1$, $R^3$, $R^4$, and $R^5$ denote hydrogen, any of $R^1$, $R^3$, $R^4$ and $R^5$ not denoting hydrogen denoting a substituent, said mercaptoaldehydes having the general formula:

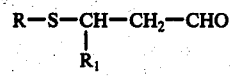

in which R is a $C_1 - C_{17}$ straight or branched alkyl group and $R_1$ denotes hydrogen or a $C_1 - C_4$ alkyl group.

2. A sulphur containing resin, according to claim 1, wherein at least two of $R^1$, $R^3$, $R^4$ and $R^5$ denote hydrogen.

3. A sulphur containing resin, according to claim 2, wherein at least two of $R^1$, $R^3$ and $R^5$ denote hydrogen.

4. A sulphur containing resin, according to claim 3, wherein $R^2$ is an aliphatic or cycloaliphatic hydrocarbyl group.

5. A sulphur containing resin, according to claim 4, wherein $R^2$ is an alkyl, alkenyl, cycloalkyl or cycloalkenyl group containing not more than 8 carbon atoms in the group.

6. A sulphur containing resin, according to claim 5, wherein $R^2$ is selected from isopropyl, n-butyl, allyl cyclohexyl groups.

7. A sulphur containing resin, according to claim 6, wherein the members $R^1$, $R^3$, $R^4$ and $R^5$ which are not hydrogen are $C_1 - C_4$ alkyl groups or halogen.

8. A sulphur containing resin, according to claim 7, wherein the meta-substituted phenol is selected from m-cresol, m-isopropylphenol and o-chloro-m-cresol.

9. A sulphur containing resin, according to claim 1, which is a mixture of one or more of the meta-substituted phenols according to claim 2, and one or more para-substituted phenols.

10. A sulphur containing resin, according to claim 9, wherein the mixture is an m/p-alkylphenol mixture.

11. A sulphur containing resin, according to claim 10, wherein the mixture is a m/p-isopropylphenol or a m/p-cresol mixture.

12. A sulphur containing resin, according to claim 11, wherein the meta-substituted phenol residues constitute at least 50% by weight of the resin.

13. A sulphur containing resin, according to claim 12, wherein R is selected from lauryl, octyl, n-butyl, isobutyl and ethyl.

14. A sulphur containing resin, according to claim 13, wherein $R_1$ is methyl.

15. A process for the production of a sulphur containing phenolic resin, which comprises subjecting (i) one or more mercaptoaldehydes, to condensation with (ii) one or more meta-substituted phenols, or a mixture of one or more meta-substituted phenols and one or more other phenols, said mercaptoaldehyde has the general formula:

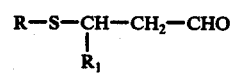

in which R is a $C_1 - C_{17}$ straight or branched alkyl group and $R_1$ denotes hydrogen or a $C_1 - C_4$ alkyl group, and said meta-substituted phenol has the formula set forth in claim 2.

16. A process, according to claim 15, wherein the molar ratio phenol to aldehyde is from 0.5 : 1 to 8 : 1.

17. A process, according to claim 16, wherein the molar ratio phenol:aldehyde is from 1 : 1 to 4 : 1.

18. A process, according to claim 17, wherein the condensation is conducted at a temperature in the range −30° C to 150° C.

19. A process, according to claim 18, conducted at a temperature in the range 10° C to 50° C.

20. A process, according to claim 19, wherein the condensation is conducted in the presence of a solvent which forms an azeotrope with the water, the solvent being added to the reaction mixture after initial reaction is complete, and the azeotrope being subsequently distilled off.

21. A process, according to claim 26, wherein said solvent is toluene.

22. A process, according to claim 21, wherein the condensation is carried out in the presence of a mercaptan catalyst and HCl.

* * * * *

UNITED STATES PATENT OFFICE
CERTIFICATE OF CORRECTION

Patent No. 4,059,569        Dated November 22, 1977

Inventor(s) Gerald William Langsley

It is certified that error appears in the above-identified patent and that said Letters Patent are hereby corrected as shown below:

Column 6, line 35, "2" should be --1--.

Column 6, line 66, "2" should be --1--.

Signed and Sealed this

Fourteenth Day of March 1978

[SEAL]

Attest:

RUTH C. MASON
Attesting Officer

LUTRELLE F. PARKER
Acting Commissioner of Patents and Trademarks